Patented Sept. 7, 1937

2,091,991

UNITED STATES PATENT OFFICE 2,091,991

GRANULATED MATERIAL AND PROCESS OF MAKING THE SAME

Clifford L. Jewett, St. Paul, Minn., assignor to Minnesota Mining & Manufacturing Company, St. Paul, Minn., a corporation of Delaware No Drawing. Application July 25, 1933, Serial No. 682,267

25 Claims. (Cl. 91—70)

This invention relates in general to granulated mineral material and more particularly to an improved process for treating granulated mineral material and to the resultant product, more especially to the production of such a granulated mineral material having a water-resistant color bearing coating suitable for embodiment in roofing material, and while the invention is described as a colored granule and process for making the same to be incorporated in roofing materials such as shingles and the like, it will be understood that the invention finds a wide field of utility.

The product of this invention may be incorporated as a coating for a roofing shingle or as an aggregate for incorporation in artificial stone such as cast stone and the like, and for the base granule I may employ natural or artificial mineral substances, such, for example, as smoky quartz, or cairngorm stone, slate, quartz, quartzite, limpid quartz crystal and, in fact, practically any of the minerals which may be found in the ordinary gravel pit, as natural mineral substances, or I may employ crushed brick and other baked clay and similar material, porcelain, terra cotta or other ceramic wastes or cement compositions.

In the prior art relating to this subject, particularly where a ceramic coating is applied to the mineral base granule under the application of high temperatures to produce a glaze thereon, it is necessary to employ care in selecting a base granule which must be refractory and free from impurities which tend to discolor the glaze.

I am enabled to employ a relatively inexpensive base granule, and the ordinary impurities found in mineral materials such as iron and manganese have no affect on the resulting color obtained in the coating, and thus practically any gravel pit may yield a granule suitable for coating according to the process of my invention.

The finished product, that is to say, the coated granule according to this invention, may be incorporated as a weather-resisting coating in a bituminously coated sheet for forming roofing material either in rolls or in shingles, or the base granule coated according to this invention may be incorporated in cast stone and the like.

Heretofore, efforts have been made to treat crushed mineral material with a color bound to the granule with an organic bond, but this is unsuited for many purposes, inasmuch as the colors are only indifferently permanent, and the organic bond does not have the life or ageing characteristics necessary, particularly where it is desired to employ the granules in cast stone and the like.

As an alternative, inorganic bonds have been experimented with, and chief among those known to me are the type employing a sodium silicate as the base or those employing metallic coloring agents and fluxing or fixing agents which must be subjected to relatively high temperatures for producing a fusion of the glazing material onto the surfaces of the granules.

In these methods and in the articles resulting therefrom the colors are contained in a sodium silicate colloidal dispersion, the granules being coated with this mixture and then fired to fix the color and the silicate bond to the granule. The chief defects of these methods and the resulting products which limit their possible use are the lack of strength of color and proper tone of color, tendency to blooming, lack of permanence of color and the limit of the range of colors available to be produced. Furthermore, these methods and the resultant articles are expensive and, as well, require care in selection of the base granule.

The principal objects and advantages of this invention reside in the provision of an improved article of manufacture, coated colored granules, which may be manufactured with a wide range of colors of extreme permanence and at a reasonable cost; the provision of treated granules of the character referred to in which a good bonding action can be attained between the base granule and the color-bearing coating; the provision of an improved granulated material suitable for use when exposed to the weather, in which desired color effects may be attained and in which steps of carrying out the process of manufacturing the same are reduced so as to reduce the cost of manufacture.

This invention also contemplates an improved method of applying a color-bearing coating to mineral granules which does not necessarily require the employment of high temperatures for fixing the color-bearing coating on the granule; the provision of an improved process in which the reaction products of metallic salts and oxides and metallic chlorides are incorporated in a coating applied to a mineral granule; the provision of an improved process and resulting article in which metallic salts and oxides, such as a metallic chloride and a metallic oxide, among which are zinc chloride, zinc oxide, magnesium chloride and magnesium oxide, sulphate of magnesium, etc., may be reacted together with a pigment to form a cement color-bearing coating for the individual granules; the provision of an improved process and resulting article wherein a metallic oxide and a mineral acid may be reacted for producing a weather-resistant coated granule; the provision of an improved article of manufacture having a color-bearing coating formed in situ thereon, including, as one of its forms, a zinc oxy-chloride cement which is set to a hard, strong weather-resisting film substantially completely coating the individual granules; and the provision of an improved process for manufacture of color-coated granules which may be carried out at room temperatures; that is to say, a process in which the color-bearing coating material may be applied to the individual surfaces of the granules, reacted in situ thereon to form a weather-resisting coating without the employment of elevated temperatures if desired.

The present invention has, as further objects, the provision of an improved granulated finished material having a colored coating which is permanent in its adherence to the granule; a coating material which has the property of desired fluidity by virtue of the process employed in the course of its application to the granule and which coating material, therefore, readily spreads on the base granule, assisting in attaining the desired permanence of adherence to the granule, and at the same time possesses suitable coefficients of expansion and contraction so that the color coating may be successfully applied on a wide range of different materials forming the base granule.

For the purpose of my invention, I have employed quartzite granules, due particularly to their ready availability to me, but it will be understood that other base granules may be employed for the purpose, as pointed out hereinabove. The present invention employs as a coating composition an inorganic reaction product of a metallic chloride and a metallic oxide, and the particular ingredients which I have employed as hereinafter pointed out are insoluble in water but, unlike ceramic glazes, it is not necessary to produce the reaction between the metallic chloride and metallic oxide with high temperatures.

I have discovered that a durable and efficient color-bearing coating may be formed in situ, if desired, on the individual particles of a granulated mineral material by the employment of various metallic chlorides and oxides, such, for example, as zinc chlorides and oxides, magnesium oxide, magnesium chloride, sulphate of magnesium, or by the reaction of a metallic oxide and a mineral acid, as will be more particularly pointed out hereinafter.

For my purposes I have found a satisfactory weather-resisting coating may be produced by several methods and materials, and have employed a compound of zinc chloride and zinc oxide, though I can obtain satisfactory results by combining magnesium oxide and magnesium chloride, or zinc oxide and magnesium chloride, or magnesium oxide and zinc chloride. In some instances I have been enabled to substitute sulphate of magnesium for magnesium chloride, obtaining acceptable results. While it is possible to employ a combination of compounds of different metals, I find that the best results are attained if the oxides and salts are of the same metal, and that excellent results are obtained with a zinc oxy-chloride coating.

Generally, in carrying out the several processes of the present invention as hereinafter disclosed, I find it desirable to coat the granules preliminarily with the soluble constituent, preferably of a highly concentrated character so that, when mixed with the insoluble or less soluble constituent, the latter will be taken up by the coating and a desired film deposited on the granule. In this process I have also generally carried out the step of incorporating the pigment or other coloring material in the insoluble ingredient, though, for some purposes, it is not necessary to adhere strictly to this mode of procedure.

While I prefer to employ a zinc oxy-chloride coating, the color-bearing coating may in one of its forms be a magnesium oxy-chloride cement, and while it is well known to combine zinc chloride and zinc oxide, or magnesium chloride and magnesium oxide for the purpose of producing cements, the employment, together with a color pigment as applied to base granules, has not heretofore been known to me.

In the more convenient form of the process according to my present invention and in its simplest form I employ a crushed or graded base granule of a mineral such, for example, as quartzite the desired size. The granules are first moistened with a solution, for example, a concentrated zinc chloride solution or other similar soluble metal salt as desired.

The thus moistened granule is then subjected to the application of a mixture of zinc oxide containing a pigment, both in a powdered condition. The mixture of the moistened granules, and the zinc oxide and pigment are then subjected to a desired agitation and the relatively highly concentrated zinc chloride coating on the surfaces of the granules, being of a wetting character, readily takes up the insoluble ingredients of the zinc oxide and the pigment so that, as the agitation carried out in the process is continued, the zinc oxide is reacted with the zinc chloride, thus tying into the coating on the granule the pigment carried by the zinc oxide.

If desired, the process may be carried out at an elevated temperature, and, for my purposes, I have employed temperatures not in excess of 60 to 70 degrees C. This heat tends to help in the reaction of the zinc oxy-chloride compound and also tends to hasten the setting of the color-bearing coating.

I find that desirable results are obtained with a concentrated zinc chloride solution which thoroughly wets the granule. After the zinc oxide and pigment are thoroughly agitated with the granules and the latter are completely coated, the mix is allowed to set for about fifteen minutes.

I prefer to use an excess of zinc chloride, most of the excess being washed away by water after the coating is set or insolubilized.

In order to insure a stable color-bearing coating I find it desirable to wash the coated granules with a fixing agent, such, for example, as an aqueous solution of sodium aluminate, sodium silicate, tri-sodium phosphate or the like. The fixing solution serves the important function of increasing the hardness and permanence of the color coating. Any excess fixing agent and soluble salts formed are then washed away with water and the granules are dried.

It is to be understood that the zinc oxy-chloride material thus produced has the advantage of relative rapid setting without agglomeration; and the fixing bath serves to produce a stable, permanent color-bearing coating.

An example of one formula which gives satisfactory results with the process above described is as follows:

| | Grams |
|---|---|
| Quartz (granulated) | 500 |
| Chromium oxide | 5 |
| Zinc oxide | 5 |
| Concentrated zinc chloride solution | 15 |

It will be understood that the color pigment may be varied as desired for producing different colors, for example, I may cite red or yellow oxide of iron, green oxide of chromium, ultramarine blue and the like.

As a further alternative form of the invention

I may employ magnesium chloride and magnesium oxide for the purpose of forming the color coating. Ordinarily, these two ingredients are mixed with water for the purpose of hastening the reaction and producing a rapid setting. This is suitable for the ordinary uses of cement of this character, but, in the employment of such ingredients with a color pigment for coating granules, it is desirable that the granules be loose and non-adhering to each other when in the finished coated state, and, for this purpose, a convenient form of the process may be as hereinafter appears.

In the modified process employing magnesium chloride and magnesium oxide I employ a crushed or graded base granule of a mineral such, for example, as quartzite of the desired size.

The granules are first moistened with an aqueous concentrated solution of magnesium chloride, and I find that, for my purposes, a solution of high concentration is desirable and have employed an aqueous solution of magnesium chloride having a specific gravity of 1.284, although it will be understood that different degrees of concentration of the solution may be successfully used, depending on the results desired.

The granule thus moistened is then subjected to the application of a mixture of magnesium oxide containing a pigment, both in a powered condition. The mixture of the moistened granules, and the magnesium oxide and pigment are then agitated to a degree sufficient to thoroughly coat the wetted granules with the magnesum oxide, the coating of magnesium chloride readily taking up the insoluble ingredients of the magnesium oxide and pigment, so that, as the agitation progresses, the magnesium oxide is reacted with the magnesium chloride, thereby tying into the coating on the granule or pigment carried by the magnesium oxide.

As hereinbefore pointed out, the process may be carried out at an elevated temperature, and I have employed temperatures not in excess of 60 to 70° C. which helps in the reaction of the magnesium oxy-chloride compound and also tends to hasten setting of the color-bearing coat.

For some purposes I may employ a formula such as appears below, from which I have obtained highly satisfactory results:

|  | Grams |
| --- | --- |
| Quartz (granular) | 500 |
| Chromium oxide | 5 |
| Magnesium oxide | 5 |
| Magnesium chloride solution specific gravity 1.284 | 10 |

As an alternative of the simple process set out above and in addition to the steps already incorporated, I may, after coating, allow the mix to stand for about two hours at room temperature, after which the mixture is again agitated to break up any lumps which may have formed as the cement sets. In some instances it is found that, after the mixture has again been allowed to stand for a second two-hour period, there is a tendency to form lumps, whereupon the mixture is again subjected to a slight agitation sufficient to cause separation of the individual granules and to permit the cement to completely set.

Usually it is desirable to allow the mass of coated granules to stand for about 8 to 10 hours, whereupon the color-bearing coating is completely set and the resulting material is weather-resistant, and, with the proper amount and character of pigment, the color will be found to be permanent.

As a further alternative step in the method set out above and for the purpose of rendering even more permanent the color-bearing coating on the individual granules, and, in addition, for the purpose of rendering insoluble the excess magnesium chloride content of the coating, I find it desirable to employ a solution of sodium aluminate or sodium silicate, or the like, as a fixing solution. The granules are placed in this solution and washed so that the excess magnesium chloride content of the coatings is rendered insoluble. The granules are then washed well with water and are found to be highly resistant to boiling water, and thus the weather-resisting characteristic of the coating on the individual granules is materially increased.

The process and the finished article of this invention have distinct advantages over the prior so-called sodium silicate process and, as well, over the so-called ceramic process, for the reason that sodium silicate is water soluble and the metallic oxides and chlorides, such as magnesium oxychloride coating, as employed by me, are water insoluble, thereby giving a more permanent coating on the granule. Furthermore, in sodium silicate methods, there is a tendency to blooming, not found in my improved methods.

The principal advantages of this invention over the so-called ceramic or glazed granules resides in the fact that the granules coated according to the present invention may be processed at room temperature, not requiring the high heat treatment for producing a fusion in the case of ceramic granules. Furthermore, as already pointed out, in the case of ceramic granules great care must be exercised in selecting the base granule so that the impurities contained in the granule will not discolor the glaze. In the present invention, there being no necessity for the high heat treatment, the color of the coating on the granule is not affected by any reaction in the base granule, and, furthermore, the base granule is not in itself weakened by any high heat treatment.

In general, it will be observed that in accordance with my preferred practice, the granules are first coated with either the magnesium chloride or zinc chloride solution and then subjected to the appropriate addition of the oxide, such as magnesium oxide or zinc oxide, which has had intermixed therewith the pigmenting material. This preferred practice hastens the coating of the individual granules in a manner permitting facile separation of the individual granules, even after the reaction has taken place between the chloride and the oxide and a certain amount of setting of the cement thereby formed, has occurred.

Though it is preferred by me to preliminarily "wet" the granules, with zinc chloride or the alkaline earth metal chlorides, preferably magnesium chloride, in an excess quantity, depending upon the subsequent washing with the fixing solution, to insolubilize the unreacted chloride, the quantity of the zinc chloride or alkaline earth chloride, preferably magnesium chloride used may be sufficient to form the requisite coating upon the individual granules and the excess of the oxide material used. This excess may form a non-adherent pulverulent material over the granules coated with the reacted oxychloride cement, facilitating the separation of the individual granules after a time sufficient to set the oxychloride cement coating on the granules. Such excess oxide on the granules may combine with the fixing solution used in the latter phase of my process to form insoluble silicates or aluminates.

Although I have exemplified the particular salts used in the formation of the oxychloride cement as zinc chloride and magnesium chloride and these materials are preferred by me, these soluble constituents may, to a certain extent, be replaced by the alkaline earth halogen compounds, preferably the chlorides, and though I prefer, as the oxide component, zinc oxide or magnesium oxide, to a certain extent, these ingredients may be replaced by the alkaline earth oxides, and to a certain extent, the hydroxides of the alkaline earth metals.

Having thus described my invention and illustrated its use, what I claim as new and desire to secure by Letters Patent is:

1. A new article of manufacture, granulated mineral material having a color bearing coating formed wholly in situ on the individual surfaces of the granules and penetrative of the pores thereof comprising a zinc oxy-chloride compound containing a coloring material.

2. A process for coating granulated mineral material which includes the steps of coating the surfaces of the granules with magnesium chloride, then, while still moist, mixing the thus coated granular material with magnesium oxide containing a pigment and agitating to distribute the coating while maintaining the granules in a separated condition.

3. The method of producing colored granulated mineral material which includes as steps thereof employing a granulated mineral material, coating the surfaces of the granules with a solution of zinc chloride, then mixing the coated granule with a quantity of magnesium oxide containing a pigment and subjecting the mass to agitation at a regulated temperature to cause setting of the coating and maintain the granules in a separated condition.

4. The method of producing colored granulated mineral material which includes as steps thereof employing a granulated mineral as a base, coating the surfaces of the individual granules with a solution of zinc chloride, then mixing the coated granule with a quantity of zinc oxide and a pigment, and agitating the mass while subjected to an elevated temperature of from 60° to 70° C., then allowing the mass to stand for a predetermined period for setting the coating on the individual granules and then again agitating, to maintain the granules in a separated condition.

5. A process for coating granulated mineral material which includes the steps of coating the surfaces of the granules with a solution of a soluble metallic chloride of the group consisting of the alkaline earth metals and zinc, then mixing the thus coated material with an insoluble metallic oxide of the group consisting of the alkaline earth metals and zinc containing a coloring material and then treating the coated granulated material by washing it with a fixing solution for rendering insoluble the excess soluble metallic chloride ingredient.

6. A process for coating granulated mineral material which includes the steps of coating the surfaces of the granules with zinc chloride, then, while still moist, mixing the thus coated granular material with zinc oxide containing a pigment, then setting the coating on said granules, and when set treating the same with a sodium silicate solution for rendering insoluble the zinc chloride content of the coatings.

7. A process for coating granulated mineral material which includes mixing the granulated material with a magnesium oxy-chloride compound in steps to prevent the agglomeration of the individual granules by initiating the oxychloride reaction on the granulated material.

8. The method of producing colored granulated mineral material which includes as steps thereof employing a granulated mineral material, coating the individual surfaces of the granules with a solution of magnesium chloride, then mixing the coated granules with a quantity of magnesium oxide containing a pigment to initiate the reaction on the granules and subjecting the mass to agitation at a regulated temperature to cause setting of the coating and maintain the granules separated.

9. The method of producing colored granulated mineral material which includes as steps thereof employing a granulated mineral as a base, coating the surfaces of the individual granules with a solution of zinc chloride, then mixing the coated granule with a quantity of magnesium oxide and a pigment to initiate the reaction on the granules, and agitating the mass while subjected to an elevated temperature of from 60° to 70° C. to maintain the granules in a separated condition.

10. The method of producing colored granulated mineral material which includes as steps thereof employing a granulated mineral as a base, coating the surfaces of the individual granules with a solution of magnesium chloride, then mixing the coated granule with a quantity of magnesium oxide and a pigment to initiate the reaction on the granules, and agitating the mass while subjected to an elevated temperature of from 60° to 70° C., then allowing the mass to stand for a predetermined period for setting the coating on the individual granules and then separating the granules into separately coated granules.

11. A process for coating granulated mineral material which includes the steps of coating the surfaces of the granules with magnesium chloride, then, while still moist, mixing the thus coated granular material with magnesium oxide containing a pigment to initiate the reaction on the granules, then setting the coating on said granules, and when set treating the same with a solution of a sodium salt of an acid radical for rendering insoluble the magnesium chloride content of the coatings.

12. The method of producing colored granular mineral material which includes as steps thereof, coating the mineral material with a solution of an alkaline earth metal chloride, agitating the granules so coated in the presence of a pulverulent alkaline earth metal oxide and a pigmenting material to initiate the reaction on the granules and continuing the agitation until the granules have taken up the oxide in quantity to form with the chloride, an oxychloride cement, and continuing the agitation to form independent particles coated with pigmented oxychloride cement.

13. The method of producing colored granular mineral material which includes as steps thereof, coating the mineral material with a solution of an alkaline earth metal chloride, agitating the granules so coated in the presence of a pulverulent alkaline earth metal oxide and a pigmenting material to initiate the reaction on the granules and continuing the agitation until the granules have taken up the oxide in quantity to form with the chloride, an oxychloride cement, and continuing the agitation to form independent particles coated with pigmented oxychloride cement, and then washing the granules so prepared with a fixing agent to render insoluble the excess of either of the mentioned materials utilized in forming an oxychloride cement.

14. The method of producing colored granular mineral material which includes as steps thereof coating the mineral material with an aqueous solution of a soluble chloride of a metal chosen from the group consisting of the alkaline earth metals and zinc, agitating the granules so treated in the presence of a pulverulent oxide chosen from the group consisting of the alkaline earth metal oxides and zinc oxide in admixture with a pigmenting material to initiate the reaction on the granules, and continuing the agitation until the granules have taken up a quantity of the material stated to form an oxychloride cement, and then agitating the particles so treated to form independent particles coated with pigmented oxychloride cement.

15. The method of producing colored granular mineral material which includes as steps thereof coating the mineral material with an aqueous solution of a soluble chloride of a metal chosen from the group consisting of the alkaline earth metals and zinc, agitating the granules so treated in the presence of a pulverulent oxide chosen from the group consisting of the alkaline earth metal oxides and zinc oxide in admixture with a pigmenting material to initiate the reaction on the granules, and continuing the agitation until the granules have taken up a quantity of the material stated to form an oxychloride cement, and then agitating the particles so treated to form independent particles coated with pigmented oxychloride cement and then washing the granules so prepared with a fixing agent to render insoluble the excess of either of the above mentioned materials utilized in forming an oxychloride cement coating upon the particles and then with a solvent liquid for washing out the excess of said fixing agent.

16. A new article of manufacture, comprising weather-resisting mineral granules, forming a base, and a weather-resisting pore penetrative coating substantially completely covering the surfaces thereof and formed and combined wholly in situ, said coating comprising the oxychloride cement type of cementitious material carrying a color pigment.

17. A granulated mineral material comprising granules whose surfaces are substantially completely coated with a color bearing cement formed by applying to and combining wholly in situ on said granules and penetrative of the pores thereof soluble and insoluble metal salts, comprising the constituents selected for forming the oxychloride cement type of cementitious material, the coloring material being carried by one of the salts entering into the formation of the oxychloride cement.

18. A process for coating granulated mineral material which includes the steps of coating the surfaces of the granules with a solution of a soluble salt of a metal taken from the group consisting of the alkaline earth metals and zinc, then mixing the thus coated material with an insoluble salt, said salts being chosen to form the oxychloride cement type of reaction product and agitating the granules to distribute the coating while maintaining the granules in a separated condition and under conditions to "set" the coating to form a weather-resisting coating.

19. A process for coating granulated material in accordance with claim 18 in which a coloring material is contained by the insoluble metallic salt.

20. A process for coating granulated mineral material which includes the steps of coating the surfaces of the granules with a soluble chloride of a metal taken from the group consisting of the alkaline earth metals and zinc, then mixing the thus coated material with an insoluble oxide containing a coloring material at an elevated temperature, said chloride and oxide being chosen to form the oxychloride cement type of reaction product and agitating to distribute the coating while maintaining the granules in a separated condition.

21. A process for coating granulated material which includes the steps of coating the surfaces of the granules with a soluble chloride of a metal taken from the group consisting of the alkaline earth metals, and of zinc, and, while still moist mixing the thus coated granular material with an insoluble metallic oxide containing a pigment, the soluble chloride and the insoluble metallic oxide being chosen to form the oxychloride cement type of reaction product and agitating to distribute the coating while maintaining the granules in a separated condition.

22. A process for coating granulated mineral material in accordance with claim 21 which includes permitting the coated mixture to "set" and then agitating the mass to separate the thus coated granules.

23. The process of substantially completely coating the surfaces of mineral granules which includes forming in situ on the granules a pore penetrative coating including the reaction product of the highly concentrated metallic chloride and metallic oxide components of an oxychloride cement type of reaction product and agitating to distribute the coating over the granules while maintaining the granules in a separated condition.

24. A process of substantially completely coating the surfaces of mineral granules in accordance with claim 23 in which the reaction on the granules is conducted while applying heat thereto.

25. A process for coating granulated mineral material which includes the steps of coating the surfaces of the granules with a solution of a soluble salt of the metals of the group consisting of the alkaline earth metals and zinc, then mixing the thus coated materials with an insoluble metallic oxide containing salt of the metals of the group consisting of the alkaline earth metals and zinc, said salts being chosen to form the oxychloride cement type of reaction product, then treating the coated granules with a solution containing an insolubilizing salt.

CLIFFORD L. JEWETT.